(12) United States Patent
Chandra et al.

(10) Patent No.: US 11,075,769 B2
(45) Date of Patent: Jul. 27, 2021

(54) ANTI-COUNTERFEITING TAG, SYSTEM AND METHOD OF MANUFACTURING AND AUTHENTICATION THEREFOR

(71) Applicant: Transpacks Technologies Private Limited, Lucknow (IN)

(72) Inventors: Satish Chandra, Kaushambi (IN); Deepak Gupta, Kanpur (IN); Priti Dwivedi, Kanpur (IN)

(73) Assignee: TRANSPACKS TECHNOLOGIES PRIVATE LIMITED, Luknow (IN)

( * ) Notice: Subject to any disclaimer, the term of this patent is extended or adjusted under 35 U.S.C. 154(b) by 0 days.

(21) Appl. No.: 16/706,274

(22) Filed: Dec. 6, 2019

(65) Prior Publication Data

US 2020/0412555 A1  Dec. 31, 2020

(30) Foreign Application Priority Data

Jun. 25, 2019 (IN) .............................. 201911025190

(51) Int. Cl.
*H04L 9/32* (2006.01)
*G06Q 30/00* (2012.01)
*G06K 19/06* (2006.01)

(52) U.S. Cl.
CPC ...... *H04L 9/3278* (2013.01); *G06K 19/06159* (2013.01); *G06Q 30/0185* (2013.01)

(58) Field of Classification Search
CPC ....... G06K 19/06037; G06K 19/06046; G06K 19/0614; G06K 19/06159; G06K 19/08; G06K 19/083; G06K 19/086; G09F 3/0297

See application file for complete search history.

(56) References Cited

U.S. PATENT DOCUMENTS

| | | | |
|---|---|---|---|
| 9,898,744 B2* | 2/2018 | Mancevski | H04L 9/3226 |
| 10,002,362 B1* | 6/2018 | Endress | G06K 19/0614 |
| 2007/0190298 A1* | 8/2007 | Hampden-Smith | B42D 25/00 428/204 |
| 2012/0241515 A1* | 9/2012 | Freeman | B42D 25/30 235/375 |
| 2020/0082235 A1* | 3/2020 | Gupta | G09F 3/0297 |

FOREIGN PATENT DOCUMENTS

IN  201611015765 A   11/2017
WO  2015077471 A1    5/2015

* cited by examiner

*Primary Examiner* — Thien M Le
*Assistant Examiner* — April A Taylor
(74) *Attorney, Agent, or Firm* — Stephen E. Zweig

(57) ABSTRACT

An anti-counterfeiting tag, system and method of manufacturing and authentication therefor are provided. The tag comprises a substrate; and a plurality of layers printed on at least a portion of the substrate; wherein one of said plurality of layers is configured to generate a self-forming three dimensional (3D) raised random pattern comprising physically unclonable function (PUF) and the other layers are configured to facilitate formation of the 3D pattern and/or to protect the formed 3D pattern.

20 Claims, 3 Drawing Sheets

Tag 12    Tag 13    Tag 14

ANTI-COUNTERFEITING TAG, SYSTEM AND METHOD OF MANUFACTURING AND AUTHENTICATION THEREFOR

RELATED APPLICATIONS

This application claims priority to Indian Patent Application No. 201911025190, entitled "Anti-Counterfeiting Tag, System and Method of Manufacturing and Authentication Therefor," filed Jun. 25, 2019, which is hereby fully incorporated herein by reference for all purposes.

TECHNICAL FIELD

The present disclosure generally relates to the field of tags, and in particular it relates to an anti-counterfeit tag having physically unclonable functions, its uses and a manufacturing method therefor.

BACKGROUND OF THE DISCLOSURE

Anti-counterfeiting is a global problem. Counterfeiting impacts virtually all products and transactions worldwide. For example, because of counterfeiting, brand owners have to suffer from huge lost because the market is robbed by the counterfeit products; normal consumers have to take the risk of accidentally purchasing or using counterfeit and unsafe products; and, the nation has to take the accusation from the world for "allowing" tidal wave of counterfeit products flooding the country. As a result, brand owners are turning to advanced anti-counterfeiting techniques such as employing physically unclonable functions (PUF) that exploit the physical properties of disordered structures, i.e., microstructures characterized by an explicitly introduced randomness or an intrinsic randomness, to attain control over their brands.

There are a variety of PUFs. However, most of the PUFs cannot be used as they require a specialized reader, such as in all cases listed under "All Electronic" or magnetic PUF (Appl. Phys. Rev. 6, 011303 (2019)). Similarly, RFID, NFC, and optical PUFs also require some special readers or communication or setup or handling. Further many of the available tags are expensive. Though there are some inexpensive NFC, they do not have the security demanded of a PUF. The tags that do provide PUF level security, along with encryption, cost more.

EP2911335 discloses a device and method for identifying genuine and counterfeited goods using challenge-response pairs (CRP) based on physical unclonable function (PUF). But this technology requires a special device to emit first electromagnetic signals by execution of programmed PUF algorithms to generate a challenge to the good for obtaining a response, such that the resulting CRP verifies the authenticity.

U.S. Pat. No. 9,082,062 discloses a method of, and a system and a label for authenticating an object in situ by creating an authentication pattern signature for the object to be authenticated, associating a random distribution of multiple, three-dimensional (3D) colored elements with the object, aiming a portable, handheld, image capture device at the object to capture return light from the elements as a single image, verifying from the single image that the elements are three-dimensional, processing the single image to generate an image pattern of the elements, comparing the image pattern with the authentication pattern signature, and indicate that the object is authentic when the image pattern matches the authentication pattern signature. The 3D elements comprise a first dataset configured as a plurality of light-modifying particles and/or bubbles and/or depressions or like structures or combinations thereof that are each sized between 25 microns and 5 millimeters, and preferably between 50 microns and 3 millimeters, and that each can have any shape, color, material, interior structure (hollow or solid), or size. Such three-dimensional elements are large enough to cast shadows and/or have characteristic colors, for subsequent image processing and analysis. Further, the PUF of the patent has only a small number of printed bubbles or like structures. In principle, these are easy to copy as they do not offer a connected or intricate structure of a large number of micro-features. Furthermore, the height that causes shadow, for 3D detection, is closer to millimeter than 25 microns. But such millimeter sized 3D features are not suitable as they degrade under abrasion during transportation.

U.S. Pat. No. 7,878,398 discloses use of randomly occurring features of a label (whether embedded or naturally inherent) to provide counterfeit-resistant and/or tamper-resistant labels. More specifically, labels including randomly-occurring features are scanned to determine the labels' features. The information from the scan is utilized to provide identifying indicia which uniquely identifies each label and may be later verified against the label features that are present to determine whether the label is genuine. In a described implementation, the identifying indicia may be cryptographically signed. But this technology requires the two ends of the fiber as coordinates to generate the random pattern. Hence, to read the pattern, fine alignment of the scanning equipment with respect to the label is required, necessitating a need for special scanner which would not be available at the point of sale retail customer.

Chong et. al (C. N. Chong, D. Jiang, J. Zhang, L. Guo, "Anti-counterfeiting with a Random Pattern", IEEE Second International Conference on Emerging Security Information, Systems and Technologies, 2008. pp. 146-153.) discloses the use of sprinkled phosphors as PUF and then store the hash value in database which eventually the user also accesses. But this requires a communication network. Also, the phosphor based PUF will require a special lighting source for illuminating and taking the image.

SUMMARY OF THE DISCLOSURE

In order to solve one or more of the above problems, the present inventors have performed numerous researches and developed a tag comprising a substrate; and a plurality of layers printed on at least a portion of the substrate; wherein one of said plurality of layers is configured to generate a self-forming three dimensional (3D) raised random pattern comprising physically unclonable function (PUF) and the other layers are configured to facilitate formation of the 3D pattern and/or to protect the formed 3D pattern.

In another aspect, the present disclosure provides a method of making a tag. The method comprises the steps of: providing a substrate; and printing a plurality of layers, layer by layer, on at least a portion of the substrate to generate a self-forming three dimensional (3D) random pattern having physically unclonable function (PUF); wherein one of said plurality of layers is configured to generate a self-forming three dimensional (3D) raised random pattern comprising physically unclonable function (PUF) and the other layers are configured to facilitate formation of the 3D pattern and/or to protect the formed 3D pattern.

In yet another aspect, the present invention provides a system and a method for authenticating a product and/or a package by using tag of 3D PUF as described above.

BRIEF DESCRIPTION OF THE DRAWINGS

The features of the present disclosure will become fully apparent from the following description taken in conjunction with the accompanying figures. With the understanding that the figures depict only several embodiments in accordance with the disclosure and are not to be considered limiting of its scope, the disclosure will be described further through use of the accompanying figures.

DETAILED DESCRIPTION OF THE DISCLOSURE

Figure 1:
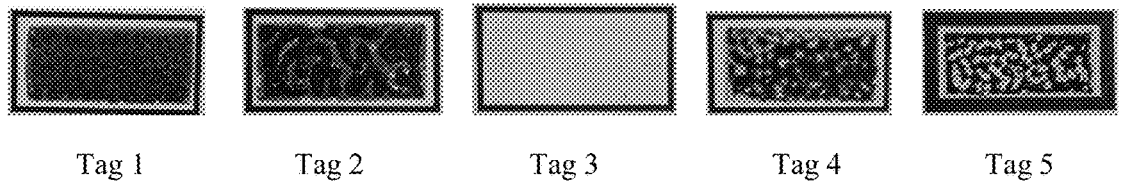
FIG. 1 illustrates tags 1-5 according to an embodiment of the present disclosure.

Before the methods of the present disclosure are described in greater detail, it is to be understood that the methods are not limited to particular embodiments described, as such may, of course, vary. It is also to be understood that the terminology used herein is for the purpose of describing particular embodiments only, and is not intended to be limiting, since the scope of the methods will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the methods. The upper and lower limits of these smaller ranges may independently be included in the smaller ranges and are also encompassed within the methods, subject to any specifically excluded limit in the stated range. Where the stated range includes one or both of the limits, ranges excluding either or both of those included limits are also included in the methods.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Disclosed is a tag comprising a substrate; and a plurality of layers printed on at least a portion of the substrate; wherein one of said plurality of layers is configured to generate a self-forming three dimensional (3D) raised random pattern comprising physically unclonable function (PUF) and the other layers are configured to facilitate formation of the 3D pattern and/or to protect the formed 3D pattern. In certain embodiments, the formed 3D random pattern is tactile with a height of 50-200 microns. In a further embodiment, the height of the raised features is not more than 70-120 microns. In yet further embodiments, the 3D random pattern comprises a large number of micro-features.

Any substrate that is suitable for a tag can be used in the present disclosure. In certain embodiments, the substrate is a paper, a plastic, a metal sheet, a foil, a label, a corrugated box, a textile or a wood.

The plurality of layers comprises at least one first layer printed on at least a portion of the substrate; at least one second layer printed on at least a portion of the first layer; and optionally, at least one third layer printed on at least a portion of the second layer. In certain embodiments, the first layer acts as an adhesive between the second layer and the substrate and promotes random pattern formation in the second layer. The third layer acts as a protective coating for the 3D random pattern.

In certain embodiments, each of said plurality of layers comprises one or more materials; and each of said layers differs in the combination and/or concentration of said one or more materials. The one or more materials is selected from a group comprising one or more resins, one or more monomers, one or more polymers, one or more pigments, one or more photoinitiators, one or more solvents, one or more varnishes, one or more paints, one or more nail polishes, one or more clay particles, and any combination thereof.

The resin is selected from a group comprising phenolic resin, modified phenolic resin, epoxy resin, modified epoxy resin, polyurethane resin, polyamide resin, acrylic acid ester (acrylate) resin, a methacrylic acid ester resin and any combination thereof.

In certain embodiments, the epoxy resin is selected from a group comprising a bisphenol epoxy resin, a naphthalene epoxy resin, a naphthalene-skeleton-modified epoxy resin, a triphenyl methane epoxy resin, an anthracene epoxy resin, a dicyclopentadiene epoxy resin, a norbornene epoxy resin, a novolak epoxy resin, a xylylene epoxy resin and any combination thereof. Bisphenol epoxy resin is a bisphenol A epoxy resin, a bisphenol F epoxy resin, a bisphenol S epoxy resin or a combination thereof. Examples of bisphenol A epoxy resin include, but are not limited to, bisphenol A epoxy acrylate, bisphenol A epoxy diacrylate, and bisphenol A epoxy dimethacrylate. Examples of novolak epoxy resin include, but are not limited to, a phenol novolak epoxy resin and a cresol novolak epoxy resin. Examples of the naphthalene-skeleton-modified epoxy resin include, but are not limited to, a naphthalene-skeleton-modified cresol novolak epoxy resin, a naphthalene diol aralkyl epoxy resin, a naphthol aralkyl epoxy resin, a methoxy naphthalene-modified cresol novolak epoxy resin, and a methoxy naphthalene dimethylene epoxy resin. The acrylic acid ester resin is selected from a group comprising epoxy acrylate, epoxy methacrylate, urethane acrylate, urethane diacrylate, urethane dimethacrylate, ethylene glycol diacrylate, triethylene glycol diacrylate, polyethylene glycol diacrylate, dipropylene glycol diacrylate and tripropylene glycol diacrylate. In certain embodiments, the resin is epoxy acrylate, urethane acrylate, styrene acrylate or a mixture thereof. In further embodiments, the resin is epoxy acrylate, urethane acrylate or a mixture of the epoxy acrylate and the urethane acrylate in any proportion.

In certain embodiments, the one or more monomers is a monofunctional monomer or a multifunctional monomer and is selected from a group comprising 1,6-hexane diol di(meth)acrylate, hexane-1,6-diol diacrylate, propoxylated neopentyl glycol di(meth)acrylate, dipropylene glycol di(meth)acrylate, tripropylene glycol di(meth)acrylate, trimethylol propane triacrylate, ethoxylated trimethylol propane triacrylate, propoxylated trimethylol propane triacrylate, tripropylene glycol diacrylate, dipropylene glycol diacrylate, propoxylated neopentyl glycol diacrylate, propoxylated glyceryl triacrylate, pentaerythritol triacrylate, 15-ethoxylated trimethylolpropane triacrylate and any combination thereof. In further embodiments, the one or more monomers is trimethylol propane triacrylate, ethoxylated trimethylol propane triacrylate, propoxylated trimethylol propane triacrylate, tripropylene glycol diacrylate and any combination thereof. In yet further embodiments, the one or more monomers is trimethylol propane triacrylate, tripropylene glycol diacrylate or a combination thereof.

In certain embodiments, one or more polymers is selected from a group comprising ethyl cellulose, cellulose acetate butyrate, carboxy methyl cellulose, and nitrocellulose. In some instances, the polymer is nitrocellulose.

In certain embodiments, any pigment known in the art can be used in the present disclosure.

In certain embodiments, one or more photoinitiators is selected from a group comprising 2,2, dimetthoxy-2-phenylacetophenone, azobisisobuthronitrile, benzoyl peroxide, α-hydroxyketone, phenyl-glyoxylate, phosphine oxide, copolymerizable amine, 2-hydroxy-2-methyl-1-phenyl-propan-1-one, benzophenone, 4-phenylbenzophenone, 2-ethylhexyl 4-dimethylaminobenzoate, 1-hydroxy-cyclohexyl-phenyl-ketone and any combination thereof.

In certain embodiments, one or more solvents is a hydrocarbon-based solvent, an alcohol-based solvent, an ether-based solvent, an ester-based solvent, or any combination thereof. The hydrocarbon-based solvent is selected from a group comprising hexane, heptane, benzene, toluene, xylene, and a combination thereof. In certain embodiments, ester based solvent is selected from a group comprising methyl acetate, ethyl acetate, n-propyl acetate, isopropyl acetate, n-butyl acetate, isobutyl acetate, isopentyl acetate, secondary butyl acetate, amyl acetate, methoxybutyl acetate, methyl lactate, ethyl lactate, butyl lactate, methyl caprylate, ethylene glycol monomethyl ether acetate, ethylene glycol monoethyl ether acetate, propylene glycol monomethyl ether acetate, propylene glycol monoethyl ether acetate, diethylene glycol monomethyl ether acetate, diethylene glycol monoethyl ether acetate, diethylene glycol monobutyl ether acetate, and a combination thereof. In certain embodiments, the alcohol-based solvent is selected from a group comprising methanol, ethanol, n-propanol, isopropanol, n-butanol, isobutanol, tert-butanol, n-pentanol, isoamyl alcohol, ethylene glycol and a combination thereof. In further embodiments, one or more solvents is selected from hexane, ethyl acetate, propyl acetate, butyl acetate, ethanol, iPrOH, xylene, and any combination thereof.

In certain embodiments, any suitable varnish known in the art or commercially available may be used in the invention described herein. For example, the varnishes commercially available from Ionic Chemicals Pvt. Ltd., Toyo Ink, Siegwerk, and DIC India can be used.

In certain embodiments, each of said plurality of layers further comprises one or more additives selected from a group comprising adhesion promoters, anti-sagging agents, anti-scratch additives, defoaming agents, dispersants, fillers, hardening agents, matting agents, rheology-modifiers, UV stabilizers, surfactants, waxes, wetting agents and a combination thereof. In some instances, the additive is a hardening agent, matting agent, a rheology-modifier, a surfactant, a wetting agent or any combination thereof.

In certain embodiments, the hardening agent is selected from a group comprising Desmodur® N75, Desmodur® N3390, Desmodur® Z4470, Desmodur® 0118 T FUSED, Drodur® L60, and Drodur® L75.

In certain embodiments, the matting agent is selected from a group comprising aluminum oxide, barium sulfate, boride, calcium carbonate, nitride, polyimide powder, silicon dioxide and zirconia. In further embodiments, the matting agent is silicon dioxide. In yet further embodiments, the matting agent is ACEMATT® such as ACEMATT® 82, ACEMATT® HK 125, ACEMATT® HK 400, ACEMATT® HK 440, ACEMATT® HK 450, ACEMATT® 790, ACEMATT® 810, ACEMATT® 3600, ACEMATT® OK 412, ACEMATT® OK 500, ACEMATT® OK 520, ACEMATT® OK 607, ACEMATT® OK 900, ACEMATT® TS 100, ACEMATT® 3300, or any combination thereof. In some instances, the matting agent is ACEMATT® 3600.

Any wetting agent may be used in the present disclosure. In certain embodiments, the wetting agent is DELTA DC® 3011, DELTA DC® 3047, DELTA-DC® 4211 or any combination thereof.

In certain embodiments, the rheology-modifier or rheology-additive is selected from a group comprising Garamite® 7305, Claytone® APA, and Laponite® RDS from BYK Additives. In yet further embodiments, the rheology-modifier or rheology-additive is a thixotropic agent. Any rheology-modifier or rheology-additive may be used in the present disclosure. In some instances, the rheology-modifier is THIXOTRON® K-230, THIXOTRON® K-410 or THIXOTRON® K-412 from K-Tech (India) Limited.

In certain embodiments, the surfactant is selected from a group comprising digitonin, Triton® X-100, Triton® X-114, TWEEN®-20, TWEEN®-80 and any combination thereof.

In certain embodiments, each of said plurality of layers comprises one or more materials that are responsive to fluorescence, magnetism, electromagnetism, electricity and/or heat.

In certain embodiments, each of said first layer and second layer comprises a combination of materials selected from one or more resins, one or more monomers, one or more pigments, one or more photoinitiators, and optionally, one or more additives, wherein the first layer and the second layer differ in the combination and/or concentrations of said materials, and one or more resins, one or more monomers, one or more pigments, one or more photoinitiators, and one or more additives are same as defined above and may present in any ratio. In some instances, the one or more resins is present in an amount of 8-50 wt % such as 8-40%, including 8-35 wt %, 8-30 wt %, 8-25 wt %, 8-20 wt %, 8-15 wt % and 10 wt % of the total weigh of the materials present in the layer. The one or more monomers is present in an amount of 45-70 wt %, such as 45-65 wt % including 45-55 wt %, 45-50 wt % of the total weigh of the materials present in the layer. The one or more pigments is present in an amount of 2-8 wt % such as 2-6 wt %, including 2-4 wt %, and 2-3 wt % of the total weigh of the materials present in the layer. The one or more photoinitiators is present in an amount of 4-15 wt % such as 4-10%, including 4-13 wt %, 4-11 wt %, 4-9 wt %, 4-7 wt %, and 4-5 wt % of the total weigh of the materials present in the layer. The one or more additives is present in an amount of 8-17 wt % such as 8-15 wt % including 8-13 wt %, 8-11 wt %, 8-9 wt % of the total weigh of the materials present in the layer.

In certain embodiments, each of said at least one first layer and at least one second layer comprises a combination of one or more varnishes, one or more solvents, and optionally, one or more additives, wherein the first layer and the second layer differ in the combination and/or concentrations of said materials, and one or more varnishes, one or more solvents, and one or more additives are same as defined above. In certain embodiments, the varnishes and the solvents can be present in any ratio with respect to one another. In certain embodiments, the ratio of the varnishes and the solvents is 20:1, such as 15:1, including 10:1 and 5:1. The additives, if present, may present in amount of 0.1-0.8 wt % of the total weigh of the materials present in the layer. In some instances, the additives present in an amount of 0.1 wt %, 0.2 wt %, 0.3 wt %, 0.4 wt %, 0.5 wt %, 0.6 wt %, 0.7 wt % or 0.8 wt % of the total weigh of the materials present in the layer.

In some instances, each of said at least one first layer and at least one second layer comprises a combination of one or more polymers, one or more pigments, one or more solvents, and optionally, one or more additives, wherein the first layer and the second layer differ in the combination and/or concentrations of said materials, and one or more polymers, one or more pigments, one or more solvents, and one or more additives are same as defined above and may present in any ratio.

In some instances, the at least one first layer comprises one or more resins; the at least one second layer comprises a combination of one or more resins, one or more solvents and one or more pigments, and optionally one or more additives; and the at least one third layer comprises one or more resins, and one or more additives, wherein the one or more resins, one or more solvents, one or more pigments, and one or more additives are same as defined above.

In certain embodiments, the at least one third layer comprises one or more resins, and one or more additives. The one or more resins and the one or more additives can be present in any ratio with respect to one another. In certain embodiments, the ratio of the resins and the additives is 20:1, such as 15:1, including 10:1 and 5:1.

Each of said at least one first layer, second layer and third layer may have a thickness of anything from about 5 microns to 200 microns. In some instances, the thickness is about 5-100 microns such as 5-50 microns including 5-40, 5-30, 5-20, 10-20 and 5-10 microns.

The present disclosure also discloses a method of making a tag. The method, according to some embodiments, comprises the steps of: providing a substrate; and printing a plurality of layers, layer by layer, on at least a portion of the substrate to generate a self-forming three dimensional (3D) random pattern having physically unclonable function (PUF); wherein each of said layers comprises one or more materials; and each of said layers differs in the combination of said one or more materials.

The printing of plurality of layers can be done using any method known in the art. In certain embodiments, the printing is done by flexo-printing, bar coating, gravure printing, slot die coating, ink-jet printing, spin-coating, spray coating, screen printing or stencil printing.

According to one embodiment, the method of making the tag further comprises a step of drying the printed plurality of layers. Any drying method known in the art can be used. In certain embodiments, the drying is a hot air drying, UV drying, infra-red drying, or photonic coupling.

In certain embodiments, the substrate is a paper, a plastic, a metal sheet, a foil, a label, a corrugated box, a textile or a wood.

In certain embodiments of the method of making the tag, the one or more materials is selected from a group comprising one or more resins, one or more monomers, one or more polymers, one or more pigments, one or more photoinitiators, one or more solvents, one or more varnishes, one or more paints, one or more nail polishes, one or more clay particles, and any combination thereof, wherein the one or more resins, one or more monomers, one or more polymers, one or more pigments, one or more photoinitiators, one or more solvents, one or more varnishes, one or more paints, one or more nail polishes, one or more clay particles, and the combinations are same as defined above.

Figure 5:
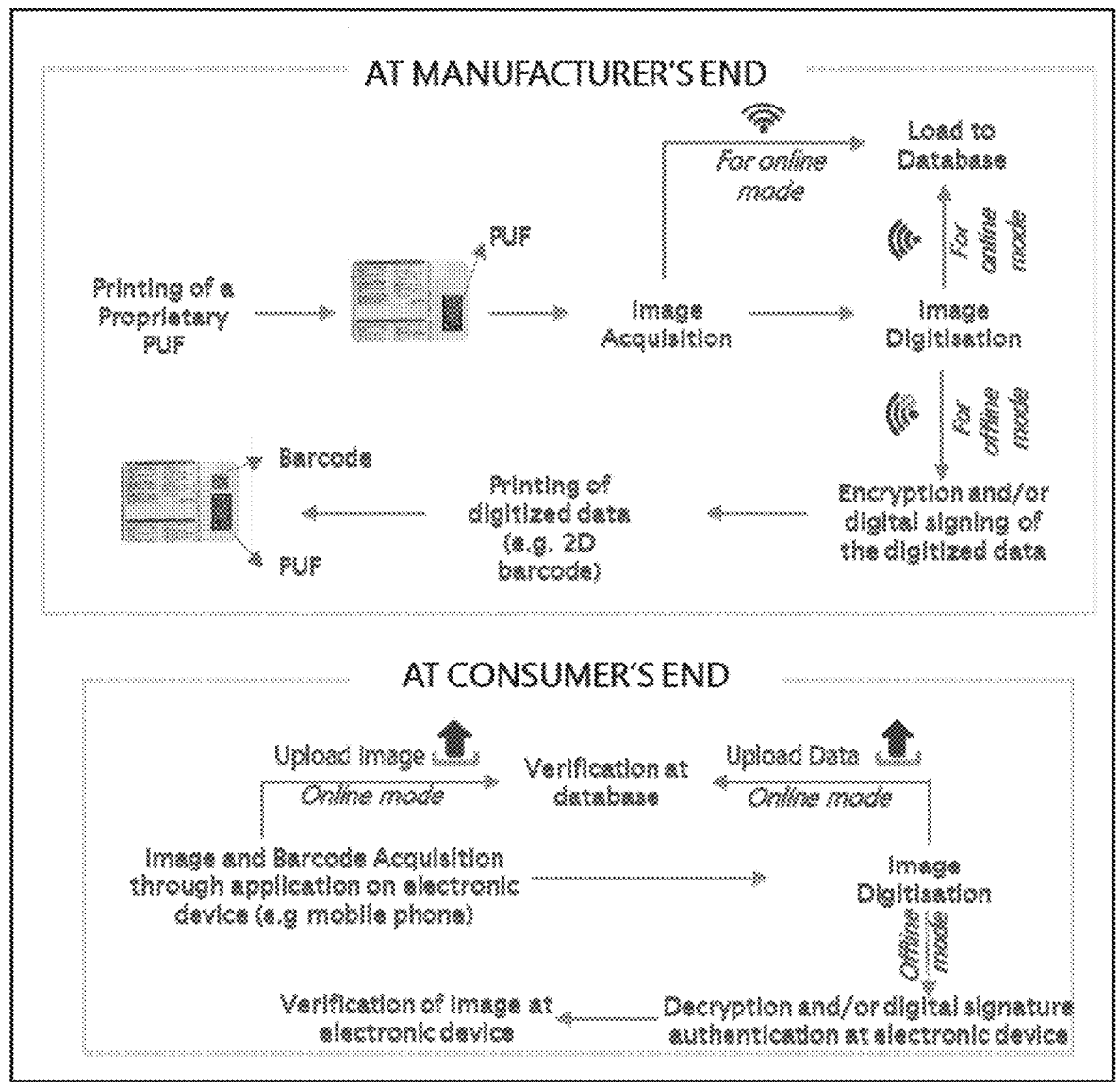
FIG. 5 illustrates a process of manufacturing a tag on the product and/or package at the manufacturer's end and then authenticating at user end, in accordance with an embodiment of the present disclosure.

The present disclosure further discloses a method and system for manufacturing a tag (or a mark or a label) on a product and/or a package as disclosed herein. As illustrated in FIG. 5, in some instances, the method of manufacturing the tag on the product and/or package further comprises the steps of: printing a tag comprising 3D random pattern, as disclosed herein, on the product and/or package; acquiring at least one image of the 3D random pattern of the tag printed on the product and/or package; and storing the acquired image in a database.

In another instances, the method of manufacturing the tag on the product and/or package further comprises the steps of: generating a digitized data of the acquired image; and storing the digitized data of the acquired image in the database. In yet another instances, the method of manufacturing the tag on the product and/or package further comprises the steps of: generating a digitized data of the acquired image; encrypting and/or digitally signing the digitized data to generate a unique code associated with the digitized data of the acquired image; and applying/printing the digitized data and/or unique code on the product and/or package.

The present disclosure also relates to a system for manufacturing a tag (or a mark or a label) on a product and/or a package. In one embodiment, the system for manufacturing the tag on the product and/or package comprises at least a printing device capable of printing the tag on the product and/or package. The printing device may be configured to perform printing by methods including screen or stencil printing, flexo-printing, gravure printing, spray coating, bar coating, spin-coating, slot die coating, ink-jet printing and other known 3D printing techniques. The printing device may comprise a printer controller to control the operation of the printing device thereby generating and printing labels or tags on the product/and or package. In one aspect, the printing device is configured to print the tag comprising the 3D random pattern on the product and/or the package.

The system may further comprise an electronic device (alternatively referred to as imaging device) capable of acquiring image(s) of the tag comprising 3D random pattern images. The electronic device may be a fixed, mounted, handheld, or a portable image acquire device having a built-in imaging module of the type universally found in consumer electronic digital cameras.

The electronic device captures/acquires the image of the 3D random pattern and stores in a database communicatively coupled with the electronic device. Further, the system may comprise a processor coupled with the imaging device and the database. The processor may be a conventional microprocessor capable of performing one or more steps of manufacturing the tag.

In one embodiment, the system manufactures the tag by printing the tag on the product/and or package. The printing device prints the tag comprising 3D random pattern on the product and/or the package. The imaging device captures the image of the 3D random pattern printed therein. The processor receives the captured image of the 3D random pattern by the imaging device and stores the received image in the database, thereby completing the manufacturing process.

In a second embodiment, the system manufactures the tag by printing the digitized data of the tag on the product and/or the package. The processor generates a digitized data corresponding to the captured image of the 3D random pattern and stores the digitized data in the database. In one aspect, the processor pre-processes the captured image using standard image processing techniques such as image enhancement using log filters, edge and ridge detection using first and second order signal filters, image thresholding, homography using perspective relation, feature definition, feature extraction, pattern recognition, and image compression techniques. Further, the processor converts the pre-processed image into a corresponding image in digital format to generate the digitized data using any known image digitization techniques in the art. The processor uploads the digitized data of the captured image in the database. Database may be for example, cloud-based database or any database residing in external servers.

In a third embodiment, the system manufactures the tag by printing a unique code of the digitized data on the product and/or the package. In one aspect, the processor generates the digitized data of the received image, perform encryption of the digitized data. The processor encrypts the digitized data and generates a unique code corresponding to the digitized data. In another aspect, the processor generates a digital signature or unique code of the digitized data using any cryptographic techniques. For example, the cryptographic techniques include, but not limited to, RSA (Rivest-Shamir-Adleman), and ECC (Elliptic Curve Cryptography), Cramer-Shoup cryptosystem, Paillier cryptosystem, YAK authenticated key agreement protocol, AES (Advanced Encryption Standard), DES (Data Encryption Standard), Diffie-Hellman key exchange, ElGamal encryption, etc. The digitized data of the 3D random pattern may be encrypted or signed or both in offline mode, to generate an encrypted or digitally signed data.

Finally, the unique code for example, barcode may be the encrypted and/or digitally signed data that may be further applied/printed on the product and/or the package. The unique code may be applied/printed on the package in any form such as a 2D image (e.g., a QR code or a bar code) or in any other form such as 1D/2D barcode. Further, the digitized data may be applied/printed on the product and/or the package using another printing device. In one example, another printing device may be a variable data printer such as thermal printer, laser printer, ink jet printer and other known variable data printers.

The present disclosure further provides a system and a method for authentication of a product. The system comprises an imaging device capable of acquiring at least one image of the tag comprising 3D random pattern. The system further comprises a database coupled with the imaging device, configured to store one or more images of the 3D random pattern, and optionally, digitized data associated with the one or more 3D random pattern images. The system furthermore comprises a processor, coupled with the imaging device and optionally the database.

In certain embodiments, the system may be a user device comprising an application implemented to authenticate the product. The application interacts with the imaging device to acquire the images of tag on the product/package. In certain embodiments, the imaging device may be fixed, mounted, handheld, portable, image capture device having a built-in image capturing device along with light source/sources. The user device may be a cellular telephone or smartphone that has a built-in imaging module. It may be understood that other mobile electronic devices, such as personal digital assistants (PDAs), tablets, computers, e-readers, media players, or like electronic devices having such modules, especially those normally readily at hand to average users may be used. The imaging device can be either dynamic or static. In some instances, the imaging device may be a mobile phone camera. In one embodiment, the imaging device captures the 3D random pattern of the tag.

The user device further comprises a processor coupled with the application and the imaging device to authenticate the tag on the product and/or package. In one example, the processor may be a conventional microprocessor.

In one embodiment, the processor receives the captured image acquired by the imaging device, uploads the received image to the database for comparison with the one or more images of the 3D random pattern in the database and authenticates the tag on the product and/or package based on comparison. The processor compares the 3D random pattern of the captured image with one or more 3D random pattern images previously stored in the database. Based on successful comparison, the processor generates an authentication signal indicating authentication of the 3D random pattern.

In a second embodiment, the processor generates a digitized data of the received image, uploads the digitized data to the database for comparison with the digitized data associated with the one or more images of the 3D random pattern in the database and authenticates the tag on the product and/or package based on comparison. Based on successful comparison, the processor generates an authentication signal indicating authentication of the 3D random pattern.

In a third embodiment, the processor receives both the unique code, e.g. barcode, and the associated 3D random pattern image and decrypts the unique code of the digitized data and/or verifies digital signature of the unique code. The processor further generates digitized data by digitization of the image of 3D random pattern and compares the digitized data with the unique code obtained by decryption and/or digital sign verification and authenticates the tag on the product and/or package based on the decryption and/or digital signature verification of the unique code. Based on successful comparison, the processor generates an authentication signal indicating authentication of the 3D random pattern.

The present disclosure also provides a method of authenticating a product and/or a package having a tag as described herein and formed by the method as described above, said method comprises: acquiring one or more images of the 3D random pattern formed on the product and/or a package; comparing the acquired image of the 3D random pattern with one or more images stored in a database, wherein the one or more images correspond to images of the 3D random pattern previously stored in a database; and authenticating the product and/or package based on comparison.

In some instances, the method for authenticating the product and/or package comprises: generating a digitized data of the acquired one or more images of the 3D random pattern; uploading the digitized data to the database for comparison with the digitized data associated with the one or more images of 3D random pattern in the database; and authenticating the product and/or package based on comparison.

In some other instances, the method for authenticating the product and/or package comprises generating a digitized data of the acquired one or more images of the 3D random pattern; acquiring a unique code formed on the product and/or package; decrypting the unique code of the digitized data and/or verifying digitally signature of the unique code;

comparing the digitized data with the unique code obtained by decryption and/or digital sign verification; and authenticating the product and/or package based on the comparison of the digitized data with the unique code.

Unless defined otherwise, all technical and scientific terms used herein have the same meaning as commonly understood by those of ordinary skill in the art to which the disclosure belongs. Although any methods and materials similar or equivalent to those described herein can be used in the practice or testing of the present disclosure, preferred methods and materials are described. For the purposes of the present disclosure, the following terms are defined below.

The articles "a" and "an" are used herein to refer to one or to more than one (i.e. to at least one) of the grammatical object of the article. By way of example, "an element" means one element or more than one element.

As used herein, the term "comprises" or "comprising" is generally used in the sense of include, that is to say permitting the presence of one or more features or components.

The present disclosure is further described with reference to the following examples, which are only illustrative in nature and should not be construed to limit the scope of the present disclosure in any manner.

EXAMPLES

Example 1: Tag 1

In this example, an Ink A, black in color was directly printed on a paper substrate. The Ink A was a combination of two resins, a monomer, a pigment, a photoinitiator, and two additives. The ink was printed by screen printing as a uniform layer. Then the printed ink was UV dried under 200 W/inch lamp for 1 second. The small black features were raised as shown in FIG. 1 (Tag 1). However, the features were not well separated.

Example 2: Tag 2

Figure 2:
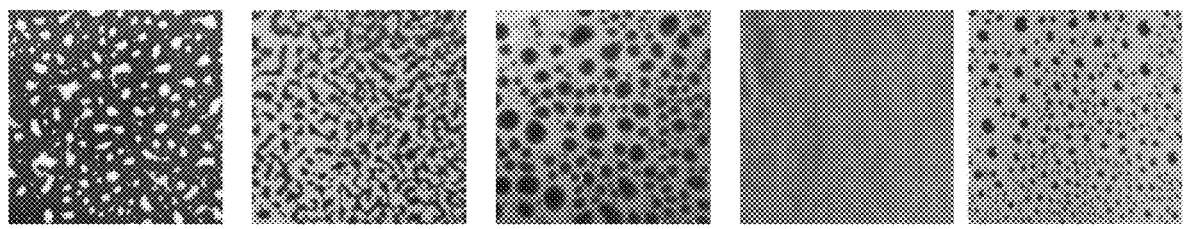
FIG. 2 illustrates tags 6-10 according to another embodiment of the present disclosure.

In this example, an Ink B was printed on a paper using similar procedure as depicted in Example 1 to get Tag 2. However, in Ink B number of resins used was one and photoinitiators were two. The Ink B was a combination of a resin, a monomer, a pigment and two photoinitiators. As shown in FIG. 2 (Tag 2), the separation in features were visible better, but there was very little contrast between the raised features (dark black) and the background which makes image processing in subsequent use of the tag for authentication difficult.

Example 3: Tag 3

Figure 3:
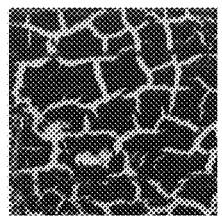
FIG. 3 illustrates tag 11 according to one more embodiment of the present disclosure.

On paper substrate, Ink C was printed within the rectangle by screen printing (see FIG. 3). The Ink C was a combination of a resin, two monomers, a photoinitiator and three additives. As shown in FIG. 1 (Tag 3), the color was transparent i.e., only the color of the paper (white) was visible. The printed ink was UV dried under 200 W/inch lamp for 1 second. The thickness of the layer was between 10-20 microns.

Example 4: Tag 4

In this example, Ink C was printed first using the same procedure as depicted in Example 2. Next, Ink A (black in color) was printed. The ink was printed by screen printing as a uniform layer and it acquired random pattern on its own. The printed ink was UV dried under 200 W/inch lamp for 1 second. The black features were raised. The height of the raised features was 70-120 microns. As shown in FIG. 1 (Tag 4), there was a good separation of raised features as compared to that of FIG. 1 and FIG. 2.

Example 5: Tag 5

On paper substrate, Ink C was printed within the rectangle by screen printing as depicted in Example 3.

Next, Ink B black in color was printed. The ink was printed by screen printing as a uniform layer and it acquired random pattern on its own. The printed ink was UV dried under 200 W/inch lamp for 1 second. The black features were raised. The height of the raised features was 70-120 microns. As shown in FIG. 1 (Tag 5), since the black features were closely packed and some of the features or separation between them was less than 100 microns, these random patterns serve as physically unclonable function (PUF).

In the Examples 4 and 5, the layer with Ink C provided necessary adhesion of Inks A and B with the paper substrate. Ink C also provided necessary conditions for the formation of raised features that are significantly separated from each other to allow contrast between the raised features (black) and background (white). Further, all the tags 1 to 5 depicted in Examples 1-5 were printed inside 18*10 mm black rectangle.

Example 6: Tags 6-10

In this example, the substrate was either a black or white paper on which a transparent uniform layer (layer 1) of thickness 10-20 microns was printed, so that color of paper was visible. Layer 1 was constituted of UV curable varnish and solvent (n-butyl acetate) in 5:1 ratio by weight. This layer 1 promotes adhesion of the second layer (layer 2) to the paper and the self-evolution of raised features in layer 2. The height of the raised features varies from 70-120 microns. The materials used were UV curable, so that UV drying was enabled. All tags were 2×2 cm.

Tag 6

On black paper, transparent layer 1 was printed by spray coating and then UV dried. On top of it, another ink (varnish 5 gm, n-Hexane 1 gm, Triton X-100 surfactant 0.02 gm, white pigment paste 0.1 gm) was uniformly screen printed with screen of 48-77 mesh size and then UV cured, within which period the raised features also self-evolved (FIG. 2, Tag 6)

Tag 7

This experiment was similar to the one depicted under Tag 6, except white paper was used and layer 2 was modified to black in color. Again, layer 1 was printed in the similar way as depicted in the previous experiment. Layer 2 ink was made from varnish (5 gm, n-Hexane 1.3 gm, black pigment paste 0.1 gm) and printed in the same way as in the previous experiment (FIG. 2, Tag 7).

Tag 8

This experiment was identical to Experiment 2, except layer 2 was spray coated uniformly. As seen from FIG. 2 (Tag 8) black raised features were visible.

Tags 9 and 10

This experiment was identical to Experiment 3, except bar coater was used to apply both layers 1 and 2 and layer 2 used magenta pigment paste. The coating of layer 2 was again uniform (FIG. 2, Tag 9 which was captured immediately after coating). Before UV drying the layer self-evolved in raised pattern (FIG. 2, Tag 10).

In FIG. 2, all the tags were 2×2 cm. Further, in the above examples, layer 1 was designed to assure adherence of layer 2 to different kinds of paper. Layer 2 can be of various colors and also both layers can be coated uniformly by a variety of methods.

Example 7: Tag 11

On a paper, a white layer 1 was printed followed by printing of black layer 2 which cracks into a random pattern upon hot air drying. Layer 1 consists of 95% NC base (30% nitro-cellulose cotton, 20% butyl acetate, 40% ethyl acetate and 10% iso-propyl alcohol), 3% white pigment paste and 2% additive (by weight). Layer 2 ink contains 15% NC base, 55% methyl ethyl ketone, 25% iso-propyl alcohol, 3% black pigment and 2% same additive as above (by weight).

The printing process for layer 1 was based on 100-micron thick stencil printing and drying with a 1000 W hot air gun in less than 2 seconds. The layer 2 was spray coated and dried using similar method described herein. The layer 2 broke up into a cracked pattern, as shown in FIG. 3 (Tag 11, 1.5×1.5 cm).

Example 8: Tags 12-15

In this example, different tags having three layers were depicted. Each tag is of 2×2 cm.

Layer 1 was K-Tech 1648 water-based primer which was applied through 6-micron bar coater and dried in air rapidly.

Figure 4:
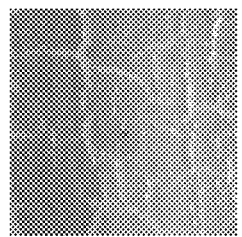
FIG. 4 illustrates tags 12-14 according to yet another embodiment of the present disclosure.
Figure 4:
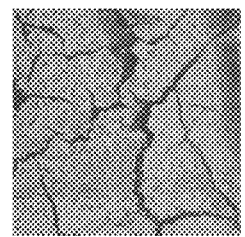
Figure 4:
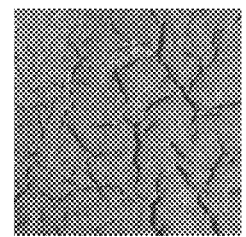

Layer 2 consisting of 80% Texture-309 (K-Tech), 2% rheology additive (THIXOTRONE® 412), 10% xylene, 7.5% ethyl acetate and 0.5% blue pigment paste (by weight) was applied through an applicator with 100 microns opening, followed by hot air drying. This layer was cracked to achieve random patterns that are raised by approximately 100 microns. Corresponding crack pattern on paper was depicted in FIG. 4 (Tag 12) and that on PET sheet in FIG. 4 (Tag 13) (brown color below was from underlying table, seen through transparent PET). When Texture 309 was replaced with Texture 310 (K-Tech), the tag obtained was as in FIG. 4, Tag 14.

Layer 3 consisting of PU resin and Desmodur N75 hardener mixed in 5:1 proportion by weight and applied through 6-micron bar coater, followed by hot air drying. This layer served as a protective coating.

We claim:

1. An anti-counterfeit tag comprising:
   a substrate; and
   a plurality of layers printed on at least a portion of the substrate;
   wherein said plurality of layers comprises:
   at least one first layer printed on at least a portion of the substrate; and
   at least one second layer printed on at least a portion of the first layer;
   wherein one of said plurality of layers is configured to act as an adhesive between the substrate and the second layer and promotes self-evolution of random raised patterns in the second layer, thus generating a self-forming three dimensional (3D) raised random pattern comprising a random pattern of raised features with heights greater than 40 microns and less than 200 microns;
   said 3D raised random pattern further comprising a physically unclonable function (PUF);
   and the other layers are configured to facilitate formation of said 3D raised random pattern and/or to protect a previously formed said 3D raised random pattern.

2. The tag as claimed in claim 1, further comprising a third layer printed on at least a portion of the second layer.

3. The tag as claimed in claim 1, further comprising a third layer that acts as a protective coating for the 3D raised random pattern.

4. The tag as claimed in claim 1, wherein each of said layers comprises one or more materials; and
   each of said layers differs in a combination and/or concentration of said one or more materials selected from a group comprising of one or more resins, one or more monomers, one or more polymers, one or more pigments, one or more photoinitiators, one or more solvents, one or more varnishes, one or more paints, one or more nail polishes, one or more clay particles, and any combination thereof.

5. The tag as claimed in claim 4, wherein said one or more materials is responsive to, magnetism, electromagnetism, electricity or heat.

6. The tag as claimed in claim 4, wherein the combination comprises:
   one or more resins, one or more monomers, one or more pigments, and one or more photoinitiators; or
   one or more polymers, one or more pigments, and one or more solvents; and
   one or more additives selected from a group comprising adhesion promoters, anti-sagging agents, anti-scratch additives, defoaming agents, dispersants, fillers, hardening agents, matting agents, rheology-modifiers, UV stabilizers, surfactants, waxes, wetting agents and a combination thereof.

7. The tag as claimed in claim 6, wherein:
   the one or more resins is selected from a group comprising phenolic resin, modified phenolic resin, epoxy resin, modified epoxy resin, polyurethane resin, polyamide resin, acrylic acid ester resin, a methacrylic acid ester resin and any combination thereof;
   the one or more monomers is a monofunctional monomer or a multifunctional monomer and is selected from a group comprising 1,6-hexane diol di(meth)acrylate, hexane-1,6-diol diacrylate, propoxylated neopentyl glycol di(meth)acrylate, dipropylene glycol di(meth) acrylate, tripropylene glycol di(meth)acrylate, trimethylol propane triacrylate, ethoxylated trimethylol propane triacrylate, propoxylated trimethylol propane triacrylate, tripropylene glycol diacrylate, dipropylene glycol diacrylate, propoxylated neopentyl glycol diacrylate, propoxylated glyceryl triacrylate, pentaerythritol triacrylate, 15-ethoxylated trimethylolpropane triacrylate, and any combination thereof;
   the one or more polymers is selected from a group comprising ethylcellulose, cellulose acetate butyrate, carboxy methyl cellulose and nitrocellulose;
   the one or more photoinitiators is selected from a group comprising 2,2, dimethoxy-2-phenylacetophenone, azobisisobuthronitrile, benzoyl peroixde, .alpha.-hydroxyketone, phenylglyoxylate, phosphine oxide, copolymerizable amine, 2-hydroxy-2-methyl-1-phenyl-propan-1-one, benzophenone, 4-phenylbenzophenone, 2-ethylhexyl 4-dimethylaminobenzoate, 1-hydroxy-cyclohexyl-phenyl-ketone and any combination thereof; and
   the one or more solvents is a hydrocarbon-based solvent, an alcohol-based solvent, an ether-based solvent, an ester-based solvent, or any combination thereof.

8. The tag as claimed in claim 7, wherein,
the hydrocarbon-based solvent is selected from a group comprising hexane, heptane, benzene, toluene, xylene, and a combination thereof;
the ester based solvent is selected from a group comprising methyl acetate, ethyl acetate, n-propyl acetate, isopropyl acetate, n-butyl acetate, isobutyl acetate, isopentyl acetate, secondary butyl acetate, amyl acetate, methoxybutyl acetate, methyl lactate, ethyl lactate, butyl lactate, methyl caprylate, ethylene glycol monomethyl ether acetate, ethylene glycol monoethyl ether acetate, propylene glycol monomethyl ether acetate, propylene glycol monoethyl ether acetate, diethylene glycol monomethyl ether acetate, diethylene glycol monoethyl ether acetate, diethylene glycol monobutyl ether acetate, and a combination thereof; and
alcohol-based solvent is selected from a group comprising methanol, ethanol, n-propanol, isopropanol, n-butanol, isobutanol, tert-butanol, n-pentanol, isoamyl alcohol, ethylene glycol and a combination thereof.

9. The tag as claimed in claim 1, wherein the substrate is a paper, a plastic, a metal sheet, a foil, a label, a corrugated box, a textile or a wood.

10. A method of making an anti-counterfeit tag, comprising the steps of:
providing a substrate; and
printing a plurality of layers by flexo-printing, bar coating, gravure printing, slot die coating, ink-jet printing, spin-coating, spray coating, screen printing or stencil printing and drying these layers, layer by layer, on at least a portion of the substrate;
wherein said plurality of layers comprises:
at least one first layer printed on at least a portion of the substrate; and
at least one second layer printed on at least a portion of the first layer;
wherein one of said plurality of layers is configured to act as an adhesive between the substrate and the second layer and promotes self-evolution of random raised patterns in the second layer, thus generating a self-forming three dimensional (3D) raised random pattern comprising a random pattern of raised features with heights greater than 40 microns and less than 200 microns;
said 3D raised random pattern further comprising a physically unclonable function (PUF);
wherein each of said layers comprises one or more materials;
and each of said layers differs in a combination of said one or more materials;
and the other layers are configured to facilitate formation of said 3D raised random pattern and/or to protect a previously formed said 3D raised random pattern.

11. The method of claim 10, further comprising an additional protective coating layer configured to protect said previously formed said 3D raised random pattern.

12. A method of manufacturing an anti-counterfeit tag for a product and/or a package, said method comprises the steps of:
printing a tag on a product and/or package, the tag comprising a plurality of layers
wherein said plurality of layers comprises:
at least one first layer printed on at least a portion of a substrate; and
at least one second layer printed on at least a portion of the first layer;
wherein one of said plurality of layers is configured to act as an adhesive between said substrate and the second layer and promotes self-evolution of random raised patterns in the second layer, thus generating a self-forming three dimensional (3D) raised random pattern comprising a random pattern of raised features with heights greater than 40 microns and less than 200 microns;
said 3D raised random pattern further comprising a physically unclonable function (PUF), and the other layers are configured to facilitate formation of the said 3D raised random pattern and/or to protect a previously formed said 3D raised random pattern;
acquiring at least one image of said 3D raised random pattern on said tag;
generating a digitized data of the at least one acquired image; and storing said at least one acquired image and/or digitized data of the at least one acquired image in a database.

13. The method of manufacturing as claimed in claim 12, further comprising:
encrypting and/or digitally signing the digitized data to generate a unique code associated with the digitized data of the acquired image; and
applying/printing the digitized data and/or unique code on the product and/or package.

14. The method of claim 12, further comprising an additional protective coating layer configured to protect said previously formed said 3D raised random pattern.

15. A system for manufacturing an anti-counterfeit tag for a product and/or a package, said system comprising:
a printing device, configured to print a tag on a product and/or package, the tag comprising a plurality of layers;
wherein said plurality of layers comprises:
at least one first layer printed on at least a portion of a substrate; and
at least one second layer printed on at least a portion of the first layer;
wherein one of said plurality of layers is configured to act as an adhesive between said substrate and the second layer and promotes self-evolution of random raised patterns in the second layer, thus generating a self-forming three dimensional (3D) raised random pattern comprising a random pattern of raised features with heights greater than 40 microns and less than 200 microns;
said 3D raised random pattern further comprising a physically unclonable function (PUF), and the other layers are configured to facilitate formation of said 3D raised random pattern and/or to protect a previously formed said 3D raised random pattern;
an imaging device, capable of acquiring at least one image of said 3D raised random pattern of the tag printed on or applied to the product and/or the package;
a database coupled with the imaging device; and
a processor, coupled with the imaging device and the database, configured to: receive the at least one image of said 3D raised random pattern acquired by the imaging device;
generate a digitized data of the at least one received image; and
store said received image and/or digitized data of the at least one received image in the database.

16. The system as claimed in claim 15, wherein the processor is further configured to:
encrypt and/or digitally sign the digitized data to generate a unique code associated with the digitized data; and enable the printing device to print/apply the digitization data and/or the unique code on the product and/or package.

17. The system of claim 15, further comprising an additional protective coating layer configured to protect said previously formed said 3D raised random pattern.

18. A method of authenticating comprising:
acquiring, by an imaging device, one or more images of a 3D raised random pattern comprising a random pattern of raised features;
said 3D raised random pattern further comprising physically unclonable function (PUF) formed on a product and/or package by printing a plurality of layers on at least a portion of a substrate;
wherein said plurality of layers comprises:
at least one first layer printed on at least a portion of the substrate; and
at least one second layer printed on at least a portion of the first layer;
wherein one of said plurality of layers is configured to act as an adhesive between the substrate and the second layer and promotes self-evolution of random raised patterns in the second layer, thus generating a self-forming three dimensional (3D) raised random pattern comprising a random pattern of raised features with heights greater than 40 microns and less than 200 microns;
comparing the one or more acquired images of said 3D raised random pattern with one or more images stored in a database,
wherein the one or more images correspond to images of said 3D raised random pattern previously stored in a database; and
authenticating the product and/or package based on this comparison.

19. The method of authenticating, as claimed in claim 18, further comprising:
generating a digitized data of the acquired one or more images of said 3D raised random pattern further comprising physically unclonable function (PUF);
uploading the digitized data of the acquired one or more images of said 3D raised random pattern further comprising physically unclonable function (PUF) to the database for comparison with digitized data associated with the one or more images of 3D raised random patterns stored in the database; and
authenticating the product and/or package based on the comparison.

20. The method of authenticating, as claimed in claim 18, further comprising:
acquiring a unique code formed on the product and/or package;
generating digitized data of one or more said images of said 3D raised random pattern further comprising physically unclonable function (PUF);
decrypting the unique code of said digitized data and/or verifying digital signatures of the unique code;
comparing said digitized data with the unique code obtained by decryption and/or digital sign verification; and
authenticating the product and/or package based on a comparison of digitized data with the unique code.

* * * * *